No. 729,711.                                                        Patented June 2, 1903.

UNITED STATES PATENT OFFICE.

GEORGES ADROT, OF MARSEILLES, FRANCE.

PROCESS OF MAKING ARTIFICIAL FUEL.

SPECIFICATION forming part of Letters Patent No. 729,711, dated June 2, 1903.

Application filed December 8, 1902. Serial No. 134,415. (No specimens.)

*To all whom it may concern:*

Be it known that I, GEORGES ADROT, a citizen of the French Republic, and a resident of Marseilles, France, have invented certain new and useful Improvements in Processes of Making Artificial Fuel, of which the following is a specification.

The object of the invention is to provide a solid fuel containing petroleum which shall be easily manufactured and which shall be exceedingly effective and economical.

According to my invention I incorporate or mix petroleum with sodium resinate. I then add some combustible or carbonaceous matter—such, for instance, as pulverized coal, sawdust, leaves, or grass—and the paste which results is diluted with hot water containing in solution a suitable metallic salt which gives an insoluble resinate. I prefer caustic lime or salts of lime, such as chlorid of calcium. This mixture loses its water very rapidly and has when cool a solid appearance, while it is sufficiently elastic to allow it to be pressed into any desired shape by any suitable machinery. The resulting blocks are as combustible as are the ordinary fuels and leave no appreciable amount of ashes.

In case petroleums are used containing very volatile ingredients it is necessary to heat the blocks or briquets to a quite high temperature—say 100°—to allow the volatilization of the light oils.

Having thus described my invention, what I claim is—

The herein-described process of making artificial fuel which consists in incorporating petroleum with sodium resinate, adding pulverized or granular carbonaceous material thereto, mixing the resulting product in a heated condition with water, containing a metallic salt, and cooling and drying the product substantially as described.

In testimony whereof I affix my signature.

GEORGES ADROT.

In presence of—
    MAURICE ADROT,
    GEORGE RIGOT.